(12) United States Patent
Rysdyk et al.

(10) Patent No.: US 11,726,480 B2
(45) Date of Patent: Aug. 15, 2023

(54) AIRCRAFT GUIDANCE WITH TRANSMITTING BEACONS

(71) Applicant: Insitu, Inc., Bingen, WA (US)

(72) Inventors: Rolf Rysdyk, Hood River, OR (US); Torsten Mack, Portland, WA (US); Mohammad Ehsan Nasroullahi, Portland, OR (US)

(73) Assignee: Insitu, Inc., Bingen, WA (US)

( * ) Notice: Subject to any disclaimer, the term of this patent is extended or adjusted under 35 U.S.C. 154(b) by 560 days.

(21) Appl. No.: 16/842,332

(22) Filed: Apr. 7, 2020

(65) Prior Publication Data

US 2023/0176579 A1   Jun. 8, 2023

(51) Int. Cl.
| | |
|---|---|
| G05D 1/02 | (2020.01) |
| G01S 1/04 | (2006.01) |
| G01S 5/14 | (2006.01) |
| G05D 1/10 | (2006.01) |
| G01S 19/11 | (2010.01) |

(52) U.S. Cl.
CPC .......... *G05D 1/0202* (2013.01); *G01S 1/0423* (2019.08); *G01S 5/14* (2013.01); *G05D 1/101* (2013.01); *G01S 19/11* (2013.01)

(58) Field of Classification Search
CPC .......... G01S 5/14; G01S 19/11; G01S 1/0423; G01S 2201/06; G05D 1/101; B63B 22/00; B63B 22/003
See application file for complete search history.

(56) References Cited

U.S. PATENT DOCUMENTS

| | | | |
|---|---|---|---|
| 3,953,856 A | 4/1976 | Hammack | |
| 4,875,646 A | 10/1989 | Browning et al. | |
| 6,657,580 B1 * | 12/2003 | Edwards | G01S 13/756 342/51 |
| 10,127,822 B2 | 11/2018 | Damnjanovic et al. | |
| 10,242,581 B2 | 3/2019 | Rysdyk | |
| 10,710,719 B1 * | 7/2020 | Lott, III | G01S 1/0423 |
| 2007/0080863 A1 * | 4/2007 | Glockler | G08B 29/22 342/463 |
| 2008/0008045 A1 | 1/2008 | Basilico | |
| 2010/0066503 A1 * | 3/2010 | Rhie | G01S 5/14 340/10.1 |

(Continued)

FOREIGN PATENT DOCUMENTS

WO   WO-2021082357 A1 *   5/2021   ............. B63B 22/00

OTHER PUBLICATIONS

A. Sawides et al., Dynamic Fine-Grained Localization in Ad-Hoc Networks of Sensors, Proceedings of the 7th Annual international Conference on Mobile Computing and Networking, p. 166-179, Jul. 2001 (Year: 2001).*

(Continued)

*Primary Examiner* — Bernarr E Gregory
*Assistant Examiner* — Fred H Mull
(74) *Attorney, Agent, or Firm* — Hanley, Flight & Zimmerman

(57) ABSTRACT

Aircraft guidance with transmitting beacons is disclosed. An example apparatus includes a transceiver of an aircraft to receive signals from deployed beacons, a signal analyzer to analyze the signals to determine distances of the respective beacons relative to the aircraft, and a position calculator to calculate a positional zone of the aircraft based on the distances.

21 Claims, 10 Drawing Sheets

(56) References Cited

U.S. PATENT DOCUMENTS

| | | | | |
|---|---|---|---|---|
| 2016/0196525 A1* | 7/2016 | Kantor | ............... | B64C 39/024 |
| | | | | 705/330 |
| 2016/0363659 A1* | 12/2016 | Mindell | ............... | G01S 13/74 |
| 2017/0006417 A1* | 1/2017 | Canoy | ............... | H04B 7/18506 |
| 2019/0187239 A1* | 6/2019 | O'Brien | ............... | G01S 5/14 |
| 2020/0156753 A1* | 5/2020 | Rikoski | ............... | B63B 22/00 |

OTHER PUBLICATIONS

Definition for buoy. (2016). The American Heritage Dictionary of the English Language (6th ed.). Houghton Mifflin. Credo Reference: https://search.credoreference.com/content/entry/hmdictenglang/buoy/0 (Year: 2016).*

European Patent Office, "European Search Report," mailed in connection with European Application 21166325.7, dated Sep. 3, 2021, 7 pages, Munich, Germany.

* cited by examiner

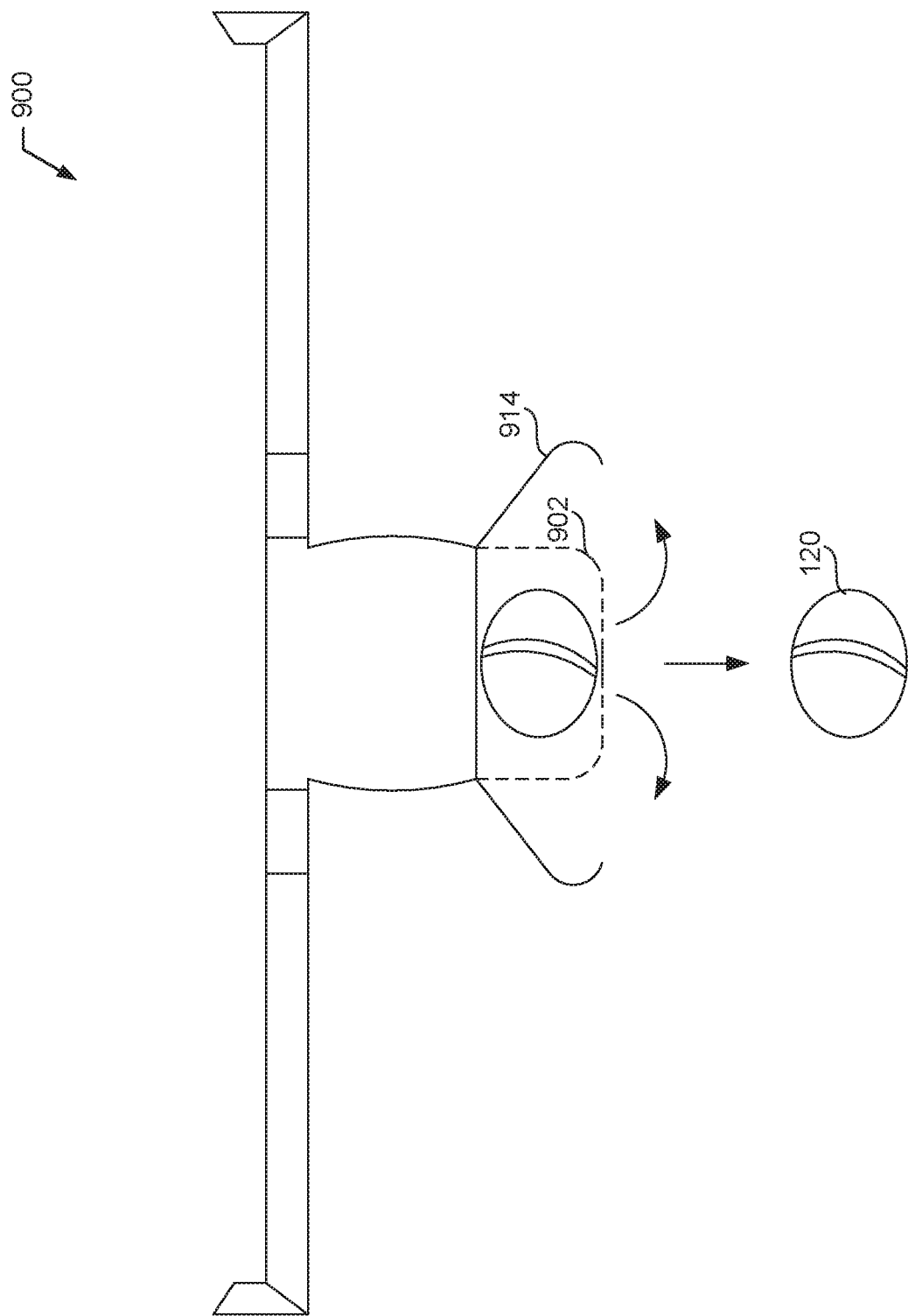

AIRCRAFT GUIDANCE WITH TRANSMITTING BEACONS

FIELD OF THE DISCLOSURE

This disclosure relates generally to aircraft and, more particularly, to aircraft guidance with transmitting beacons.

BACKGROUND

Typically, aircraft, such as unmanned aerial vehicles (UAVs), rely on external global positioning system (GPS) signals for guidance and navigation. However, in some locations or areas, the GPS signals can sometimes be obscured and/or exhibit a relatively low signal strength. To mitigate the effects of relatively low signal strength GPS signals, some known guidance systems employ differential locations based on known last positions. However, the accuracy of these systems decreases as time progresses and/or distance is increased.

SUMMARY

An example apparatus includes a transceiver of an aircraft to receive signals from deployed beacons, a signal analyzer to analyze the signals to determine distances of the respective beacons relative to the aircraft, and a position calculator to calculate a positional zone of the aircraft based on the distances.

An example system for determining a positional zone of an aircraft includes first and second beacons, the first and second beacons deployed to transmit signals to the aircraft, a transceiver of the aircraft to receive the signals, and a position calculator to determine a positional zone of the aircraft based on distances between the aircraft and the first and second beacons, the distances determined from the signals.

An example method of determining a positional zone of an aircraft includes deploying first and second beacons, transmitting signals from the first and second beacons, determining, by executing instructions with at least one processor, distances between the aircraft and the first and second beacons based on the signals, and calculating, by executing instructions with the at least one processor, the positional zone based on the distances.

An example non-transitory machine readable medium includes instructions, which when executed, cause a processor to at least determine distances between an aircraft and first and second deployed beacons, the distances determined based on signals transmitted from the beacons and received at a transceiver of the aircraft, and calculate a positional zone of the aircraft based on the determined distances.

BRIEF DESCRIPTION OF THE DRAWINGS

FIGS. 9A-9C depict an example beacon deployment system that can be implemented in examples disclosed herein.

Figure 1:
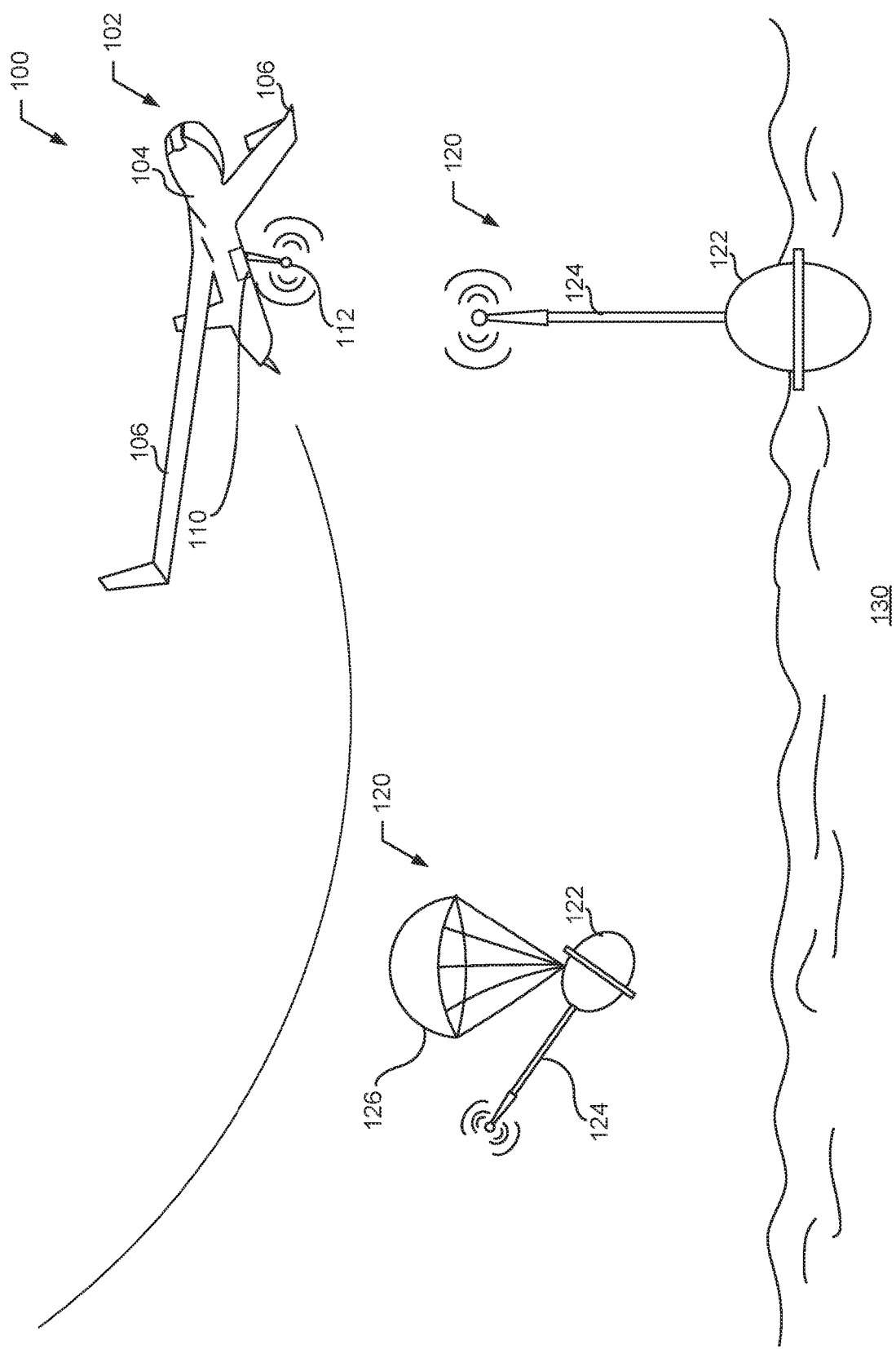
FIG. 1 illustrates an example aircraft guidance system in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft guidance with transmitting beacons is disclosed. Some areas can have relatively low global position system (GPS) signals due to weather conditions, obstructions, etc. When flying through these areas, some known guidance systems of aircraft employ differential systems that estimate a positional change based on a known previous position. However, inaccuracies of these systems can be more significant as a distance from the known previous position increases or as time increases (e.g., due to known previous positions evolving or drift associated with Micro-Electro Mechanical Systems (MEMS) based inertial measurement units).

Examples disclosed herein enable accurate aircraft navigation in areas with relatively low GPS signals. Further, examples disclosed herein do not necessitate on-board GPS sensing for an aircraft, thereby saving weight, cost and complexity thereof. As a result, aircraft range and/or payloads can be increased. Examples disclosed herein implement beacons (e.g., deployable transmitting beacons) that are positioned at known, measured and/or monitored positions. The beacons transmit signals that are received at a transceiver of an aircraft and, in turn, analyzed to determine distances between the beacons and the aircraft. For example, signal strengths of these transmitted signals are used to determine a positional zone (e.g., a position, a zone of probability, a probabilistic region or area, etc.) of the aircraft. In particular, the signal strengths of each of the beacons are used to perform a lateration (e.g., a bilateration, a trilateration, etc.) by a position calculator. Additionally or alternatively, placement positions of the beacons define a flight path of the aircraft.

In some examples, two of the beacons are utilized to perform the lateration. In other examples, three or more of the beacons are utilized. In some examples, the positional data is used to guide and/or direct a movement of the aircraft. In some examples, the beacons are deployed by the aircraft. In some such examples, the aircraft deploys the beacons during flight so that the beacons can be utilized to guide the aircraft. In some examples, the beacons are implemented as buoys that can float on water. In some other examples, the beacons are implemented as aircraft and/or vehicles. Additionally or alternatively, the beacons include parachutes. In some examples, the beacons can move to desired locations to provide navigational support for the aircraft.

As used herein, the term "positional zone" refers to areas, zone and/or positions associated with a moving vehicle. Accordingly, the term "positional zone" can refer to a position, a planar region, a contour region and/or a volumetric region. As used herein the terms "beacon" and "transmitting beacon" refer to deployed components, devices and/or assemblies that transmit signals for navigational use.

FIG. 1 illustrates an example aircraft guidance system 100 in accordance with teachings of this disclosure. The aircraft guidance system 100 of the illustrated example includes an aircraft 102 which, in turn, includes a fuselage 104, wings 106, a navigation controller 110 and a transceiver 112. In the example of FIG. 1, the aircraft 102 is an unmanned aerial vehicle (UAV). In other examples, however, the aircraft 102 may be a manned vehicle. In various examples, the aircraft 102 may be piloted by a human or may be an autonomous vehicle with passengers, cargo or other payload. The aircraft guidance system 100 further includes multiple beacons (e.g., transmitting beacons, guidance beacons, etc.) 120, all of which include a body 122 and a transceiver 124. In some examples, the beacons 120 include a parachute or parafoil 126.

To position the beacons 120 for guidance of the aircraft 102, the aircraft 102 of the illustrated example releases (e.g., drops) the beacons 120 at different locations and/or positions on a body of water 130 during flight. In particular, the beacons 120 are deployed with the parachutes 126 for a controlled descent onto the body of water 130. In this example, the beacon bodies 122, which have an ovular shape in this example, enable the beacons 120 to float while maintaining the transceiver 124 in a substantially upright orientation (in the view of FIG. 1). In other examples, the beacons 120 are placed on (e.g., dropped onto) land and/or land-based structures. While two of the beacons 120 are implemented in this example, any appropriate number (e.g., three, four, five, ten, twenty, fifty, one hundred, etc.) of the beacons 120 can be implemented instead. For example, three or more of the beacons 120 may be implemented to triangulate a position of the aircraft 102. Additionally or alternatively, a speed and/or heading of the aircraft 102 is determined.

To determine a positional zone and/or position of the aircraft 102, each of the transceivers 124 transmits a unique signal (e.g., an encoded signal, a specific frequency, a specific delay in pulses, etc.) that is received and measured at the transceiver 112 of the aircraft 102. In the illustrated example, the navigation controller 110 utilizes signal strengths of the signals from the transceivers 124 to perform a lateration of the aircraft 102. In particular, the navigation controller 110 calculates a positional zone (e.g., a parametric positional zone, a position) of the aircraft 102 based on differences in the signal strengths. In some examples, the navigation controller 110 can determine a range (e.g., a probability range, a probability distribution, etc.) of the aircraft 102. Additionally or alternatively, signal delays, pulse patterns and/or time-of-flight calculations are performed on the signals.

In some examples, the transceivers 112 of the aircraft 102 utilize and/or measure signals (e.g., radio frequency (RF) signals, lasers, light detection and ranging (LIDAR), etc.) from the beacons 120 as the beacons 120 are moved into position. In some examples, the beacons 120 include GPS receivers to determine known positions thereof. In some examples, the beacons 120 are deployed in response to a diminished strength of a GPS signal.

In some examples, movement of the beacons 120 is estimated by the navigation controller 110 based on known wind estimates and/or wind drift measured from corresponding release points. Additionally or alternatively, the navigation controller 110 accounts for oceanic current and littoral tidal flows (e.g., via forecast tables) to account for drift of the beacons 120. In some other examples, the beacons 120 are moved (e.g., based on a desired flight path or a change in flight path of the aircraft 102). In some such examples, the beacons 120 may include respective propulsion devices or mechanisms. In some examples, the beacons 120 are deployed in an area with sufficient GPS signals while the aircraft 102 is guided in an area with compromised or relatively low GPS signals.

Figure 2:
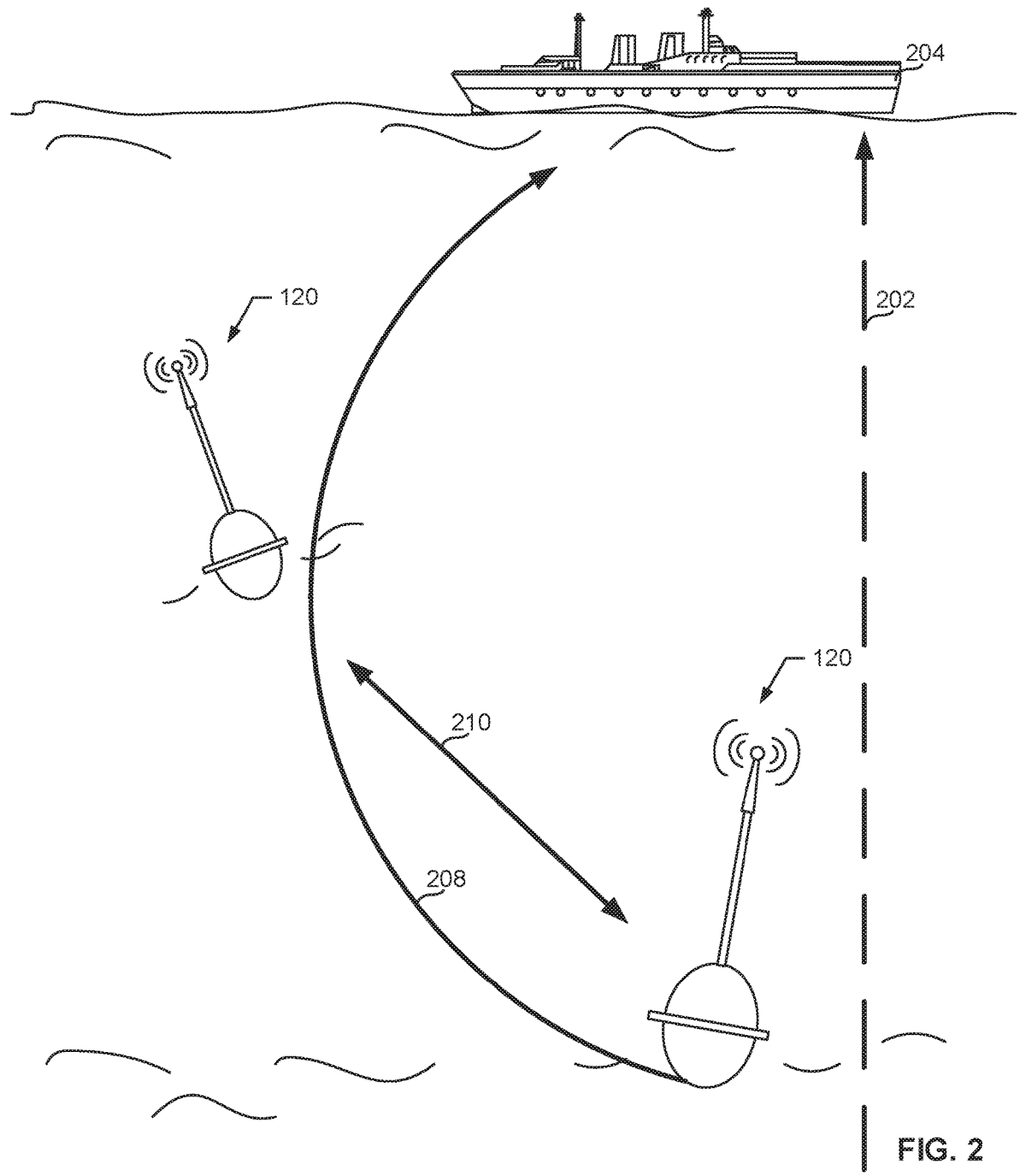
FIG. 2 illustrates an example implementation of the example aircraft guidance system of FIG. 1.

FIG. 2 illustrates an example implementation of the example aircraft guidance system 100 of FIG. 1. FIG. 2 shows a nominal route 202 between the aircraft 102 (shown in FIG. 1) and a target destination 204, which is a ship in this example. In this example, the nominal route 202 corresponds to a direct route between the aircraft 102 and the target destination 204. As can be seen in FIG. 2, at least one of the beacons 120 is deployed and/or positioned offset from the nominal route 202.

In operation, the placement of the beacons 120 defines a navigation-aiding route 208 along which the aircraft 102 is guided to fly. Accordingly, a baseline (e.g., a baseline distance, a baseline spacing, etc.) 210 is defined between the beacons 120. In this example, movement of the aircraft 102 is adjusted to the navigation-aiding route 208 so that the baseline 210 provides a desired accuracy for movement toward the target destination 204. In other words, the aircraft 102 is directed away from the nominal route 202 and guided along the navigation-aiding route 208, which is defined by placement of the beacons 120.

In some examples, the beacons 120 are deployed by the aircraft 102. In other examples, the beacons 120 are deployed and/or positioned by other vehicles (e.g., manned or unmanned aircraft, submersibles, watercraft, robots, land vehicles, etc.). Additionally or alternatively, the beacons 120 are moved, launched and/or propelled to adjust the aforementioned navigation-aiding route 208.

Figure 3:
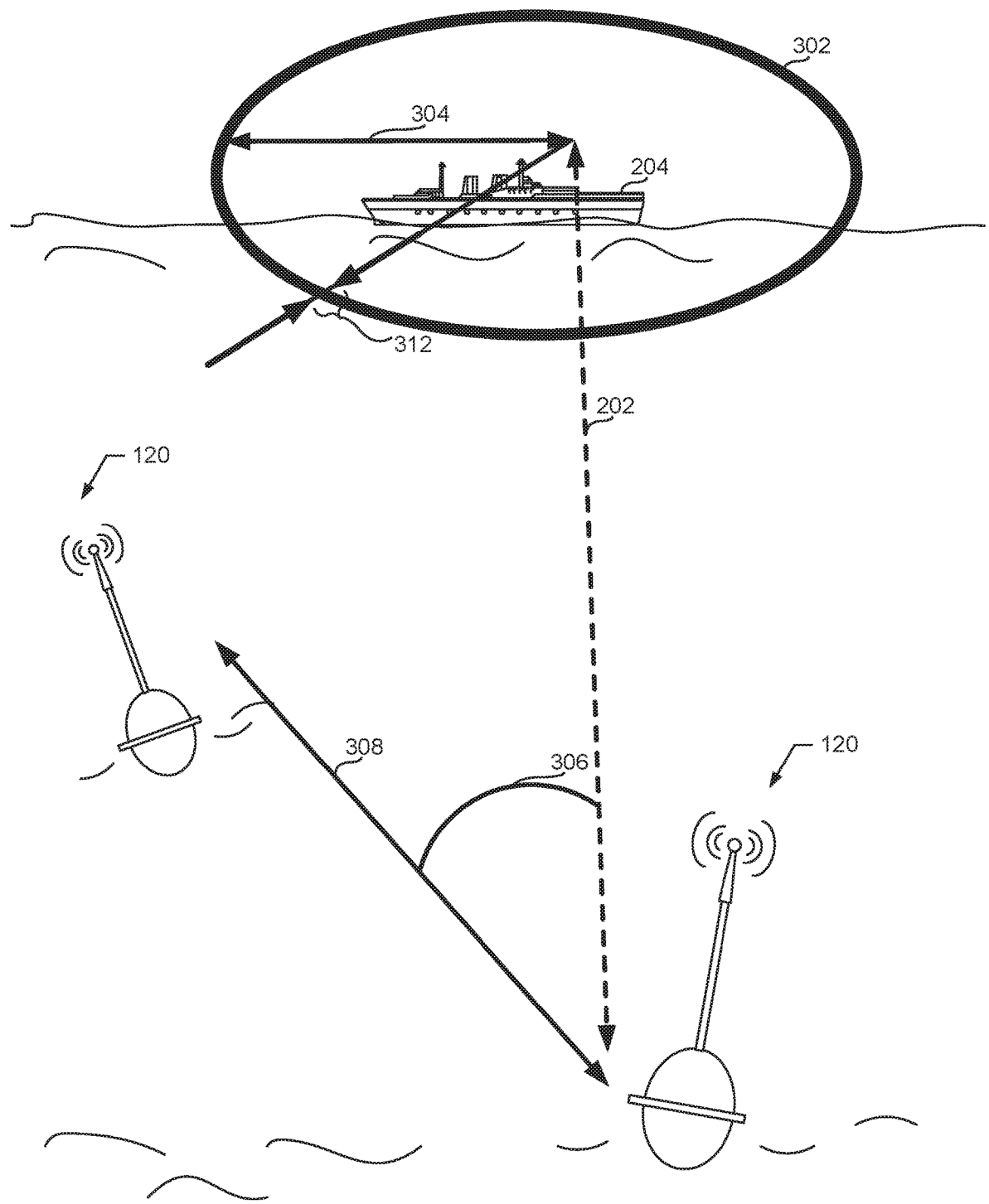
FIG. 3 illustrates another example implementation of the example aircraft guidance system of FIG. 1.

FIG. 3 illustrates another example implementation of the example aircraft guidance system 100 of FIG. 1. In this example, the aircraft 102 (shown in FIG. 1) is being directed toward a target area or region 302 defined by the target destination 204 based on signals transmitted from the beacons 120. In particular, the aircraft 102 is directed toward the target destination 204 so that the aircraft 102 will perform a remote orbit at a radius 304.

In operation, the nominal route 202, a baseline 308 and an orientation of the beacons 120, as generally indicated by an angle 306, define an accuracy of the target area 302. Accordingly, the accuracy can be parametrically expressed and monitored with positions (e.g., estimated positions, measured positions, etc.) of the beacons 120 and distances defined between the beacons 120 and the aircraft 102. In some examples, the accuracy of the control of the aircraft 102 can be maintained within a requisite level based on positions of the beacons 120 relative to the target area 302. In this example, an area 312 represents a desired navigational accuracy. In some examples, a mission of the aircraft 102 is canceled and/or altered based on the accuracy exceeding a threshold.

Figure 4:
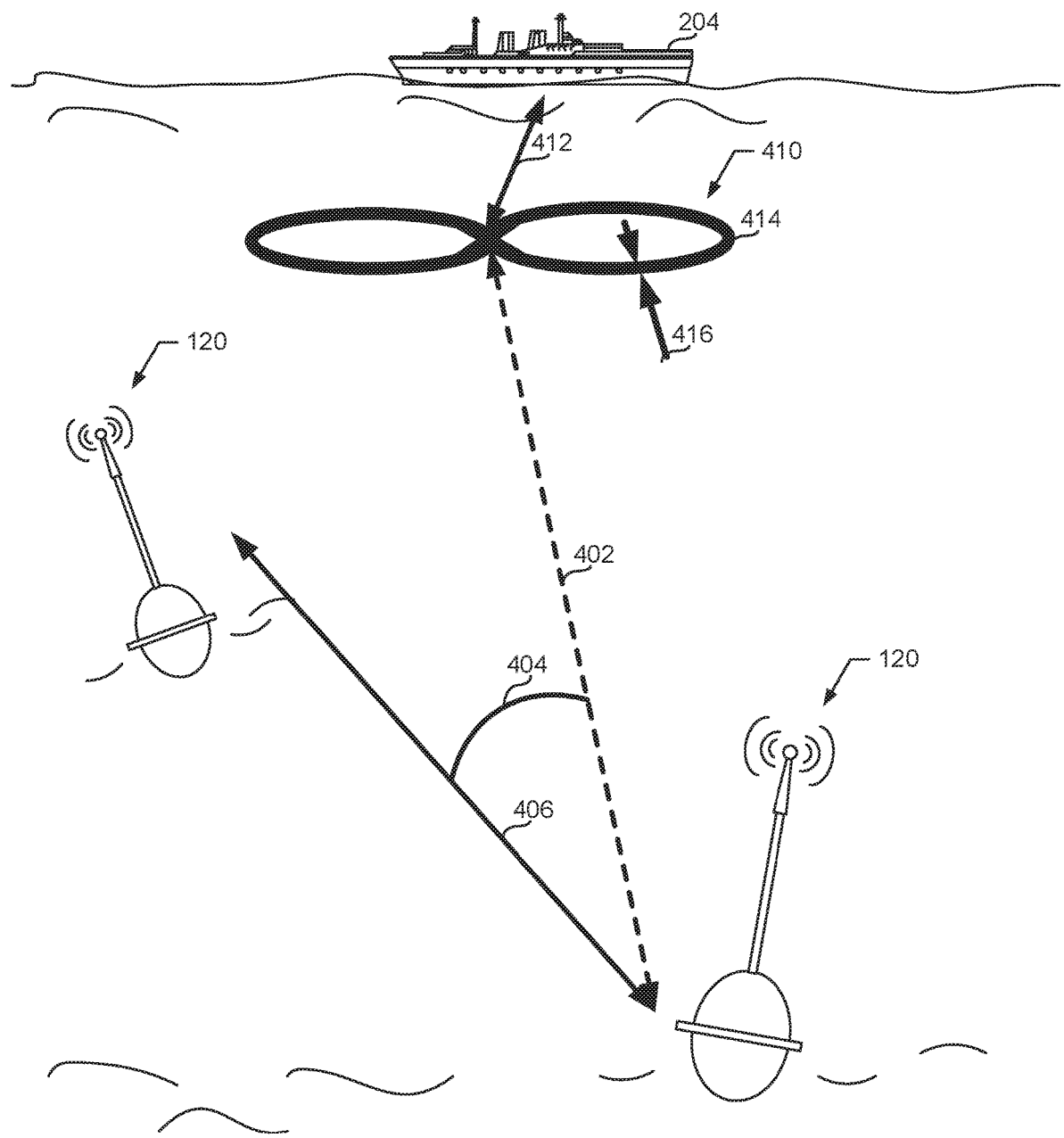
FIG. 4 illustrates yet another example implementation of the example aircraft guidance system of FIG. 1.

FIG. 4 illustrates yet another example implementation of the example aircraft guidance system 100 of FIG. 1. In the illustrated example, a standoff observation pattern of the aircraft 102 (shown in FIG. 1) is being maintained. In the example of FIG. 4, a nominal route 402, an angle 404 and a baseline 406 are shown. In this example, the positions of the beacons 120 define a standoff pattern 410 that is offset from the target destination 204 by a distance 412. Particularly, the aforementioned standoff pattern 410 defines a movement pathway 414 with a corresponding accuracy band 416.

Figure 5:
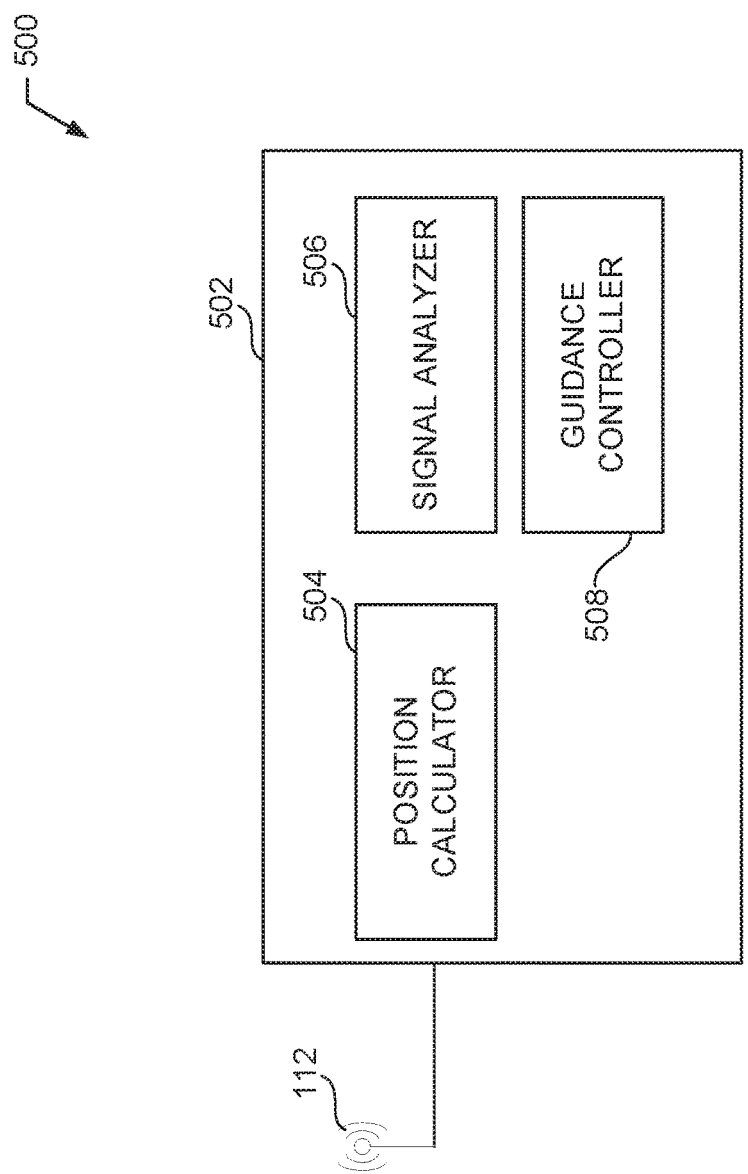
FIG. 5 is a schematic overview of a guidance analyzer system that can be implemented in examples disclosed herein.

FIG. 5 is a schematic overview of a guidance analyzer system 500 that can be implemented in examples disclosed herein. The example guidance analyzer system 500 can be implemented in the navigation controller 110 (shown in FIG. 1) and includes a guidance analyzer 502, which is communicatively coupled to the transceiver 112. In turn, the example guidance analyzer 502 includes a position calculator 504, a signal analyzer (e.g., a signal strength analyzer) 506 and a guidance controller 508.

The signal analyzer 506 of the illustrated example analyzes measured strengths of signals transmitted from the beacons 120 to determine distances between the beacons 120 and the aircraft 102. In particular, the signal analyzer 506 measures differences between the signal strengths of ones of the beacons 120. Additionally or alternatively, the signal analyzer 506 analyzes and/or determines a delay in the signals to calculate the distances of the beacons 120 relative to the aircraft 102.

The example position calculator 504 determines a position, heading and/or positional zone of the aircraft 102 based on the distances of the beacons 120 to the aircraft 102. In this example, the position calculator 504 performs a lateration (e.g., a bilateration, a trilateration, etc.) based on the relative and/or differential signal strengths of the signals transmitted by the beacons 120 in conjunction with known locations of the beacons 120 (e.g., via GPS measurements). In this example, a positional zone of the aircraft 102 is determined by the position calculator 504. Additionally or alternatively, the position calculator 504 determines a position (e.g., in three-dimensional space) of the aircraft 102. In some examples, the position calculator 504 utilizes wave patterns transmitted from the beacons 120 and/or round trip time of flight (RTOF) signals to determine the positional zone of the aircraft 102.

In the illustrated example, the guidance controller 508 is implemented to guide a movement of the aircraft 102. In this example, the guidance controller 508 directs a movement of the aircraft 102 based on the determined position and/or positional zone of the aircraft 102.

While an example manner of implementing the guidance analyzer system 500 of FIG. 5 is illustrated in FIG. 5, one or more of the elements, processes and/or devices illustrated in FIG. 5 may be combined, divided, re-arranged, omitted, eliminated and/or implemented in any other way. Further, the example position calculator 504, the example signal analyzer 506, the example guidance controller 508 and/or, more generally, the example guidance analyzer system 500 of FIG. 5 may be implemented by hardware, software, firmware and/or any combination of hardware, software and/or firmware. Thus, for example, any of the example position calculator 504, the example signal analyzer 506, the example guidance controller 508 and/or, more generally, the example guidance analyzer system 500 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example position calculator 504, the example signal analyzer 506, and/or the example the example guidance controller 508 is/are hereby expressly defined to include a non-transitory computer readable storage device or storage disk such as a memory, a digital versatile disk (DVD), a compact disk (CD), a Blu-ray disk, etc. including the software and/or firmware. Further still, the example guidance analyzer system 500 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
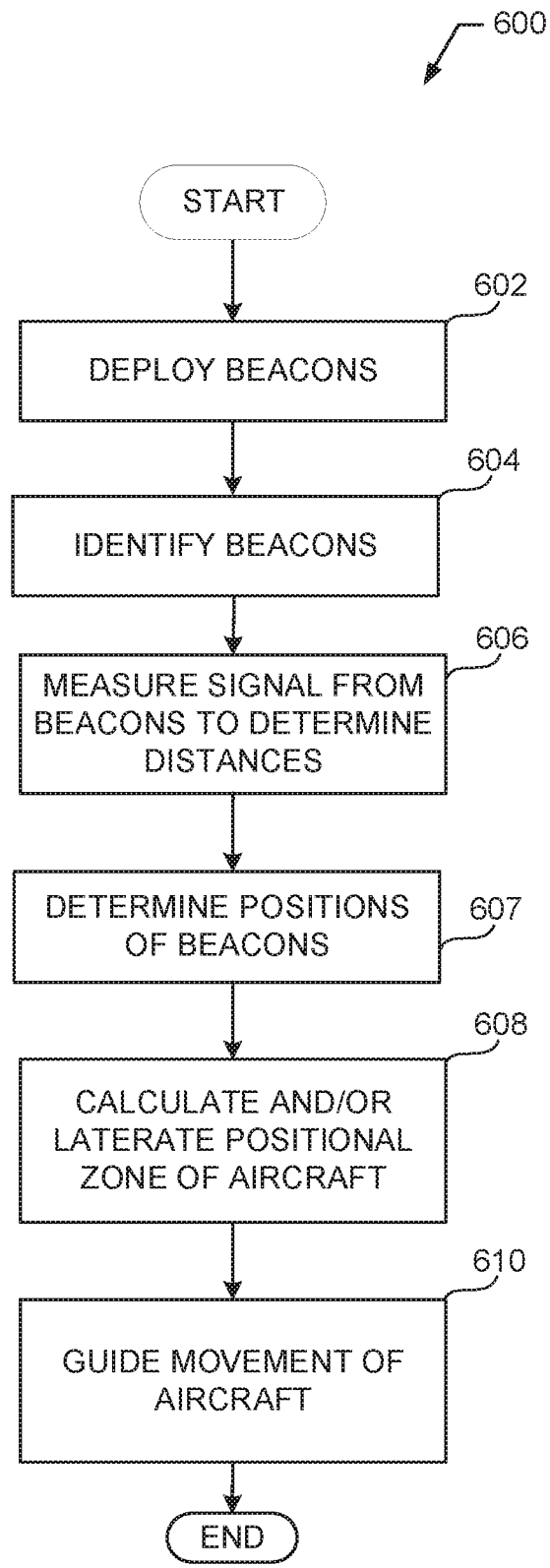
FIG. 6 is a flowchart representative of machine readable instructions which may be executed to implement the example aircraft guidance system of FIG. 1 and/or the example guidance analyzer system of FIG. 5.

A flowchart representative of example hardware logic, machine readable instructions, hardware implemented state machines, and/or any combination thereof for implementing the guidance analyzer system 500 of FIG. 5 is shown in FIG. 6. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example guidance analyzer system 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 600 of FIG. 6 begins as the aircraft 102 has been deployed for a mission in a maritime environment with limited GPS coverage. In the illustrated example, the aircraft 102 is being directed to fly along a patrol flight path that is proximate the target destination 204.

At block 602, the beacons 120 are deployed from the aircraft 102. In the illustrated example, the guidance controller 508 directs the aircraft 102 to deploy (e.g., drop) the beacons 120 at desired positions and/or locations. In other examples, the beacons 120 are dropped by other aircraft and/or vehicles (e.g., on other missions).

At block 604, in some examples, the signal analyzer 506 identifies and/or authenticates the beacons 120. For example, the signal analyzer 506 may utilize unique signals, transmitted identifiers and/or pulses transmitted from the beacons 120 to identify specific designated ones of the beacons 120.

At block 606, the signal analyzer 506 measures signals from the beacons 120 to determine distances from the beacons 120 to the aircraft 102. In this example, the signal analyzer 506 measures signal strengths transmitted from the beacons 120 when the beacons 120 are positioned at known and/or measured positions.

At block 607, in some examples, the position calculator 504 determines positions of the beacons 120. For example, the beacons 120 can transmit their GPS positions to the transceiver 112. In some other examples, the beacons 120 are placed at and/or moved to known fixed positions.

At block 608, the position calculator 504 of the illustrated example calculates and/or laterates a positional zone (e.g., a position, a parametric range, etc.) of the aircraft 102 based on the aforementioned distances and/or signal strengths from the signal analyzer 506. In this example, the position calculator 504 performs a bilateration analysis utilizing known, determined and/or measured positions of the beacons 120.

At block 610, the example guidance controller 508 guides movement of the aircraft 102 based on the positional zone calculated by the position calculator 504.

Figure 7:
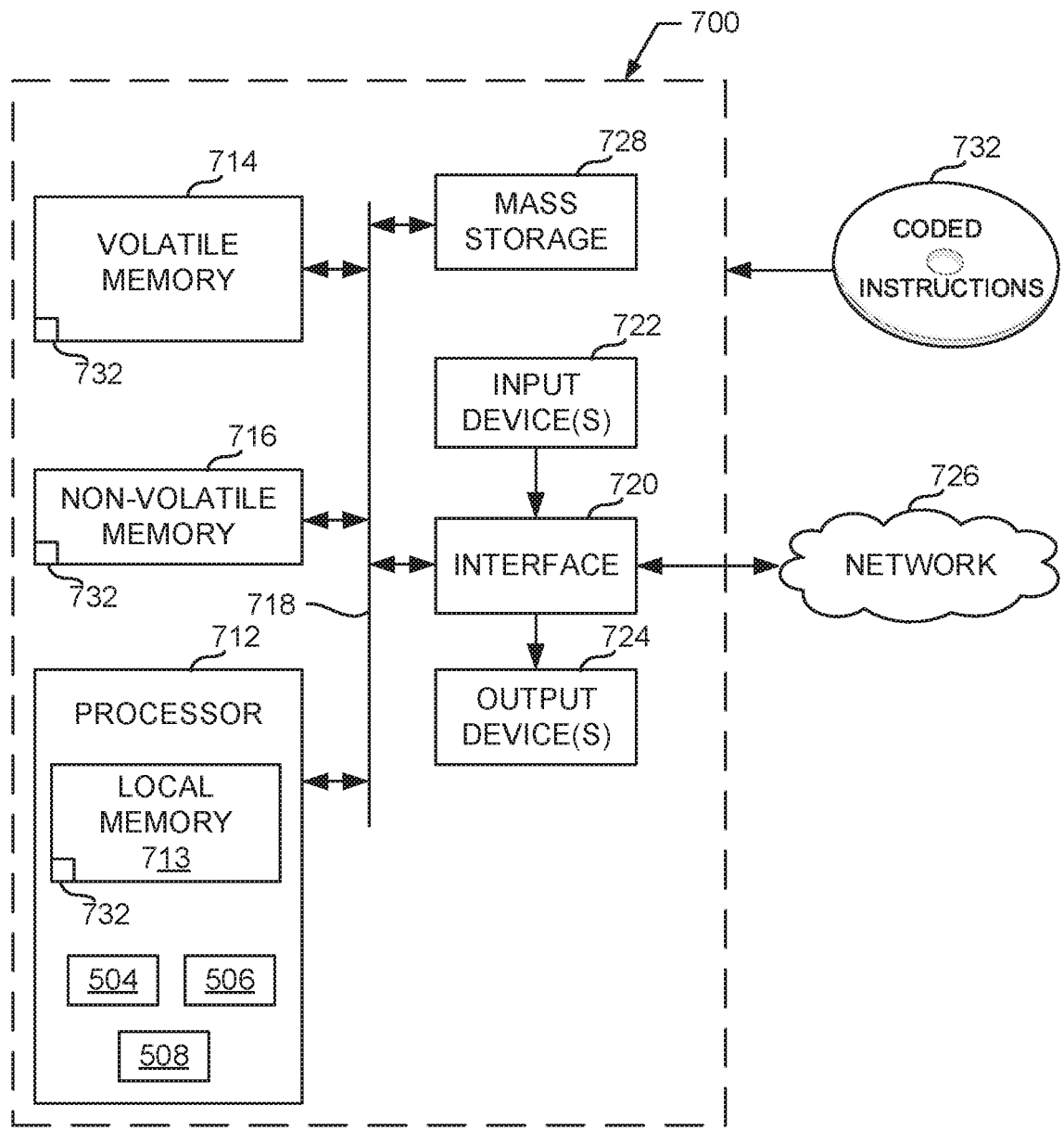
FIG. 7 is a block diagram of an example processing platform structured to execute the instructions of FIG. 6 to implement the example aircraft guidance system of FIG. 1 and/or the example guidance analyzer system of FIG. 5.

FIG. 7 is a block diagram of an example processor platform 700 structured to execute the instructions of FIG. 6 to implement the guidance analyzer system 500 of FIG. 5. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example position calculator 504, the example signal analyzer 506 and the example guidance controller 508.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 7 may be stored in the mass storage device 728, in the volatile memory 714, in the non-volatile memory 716, and/or on a removable non-transitory computer readable storage medium such as a CD or DVD.

Figure 8:
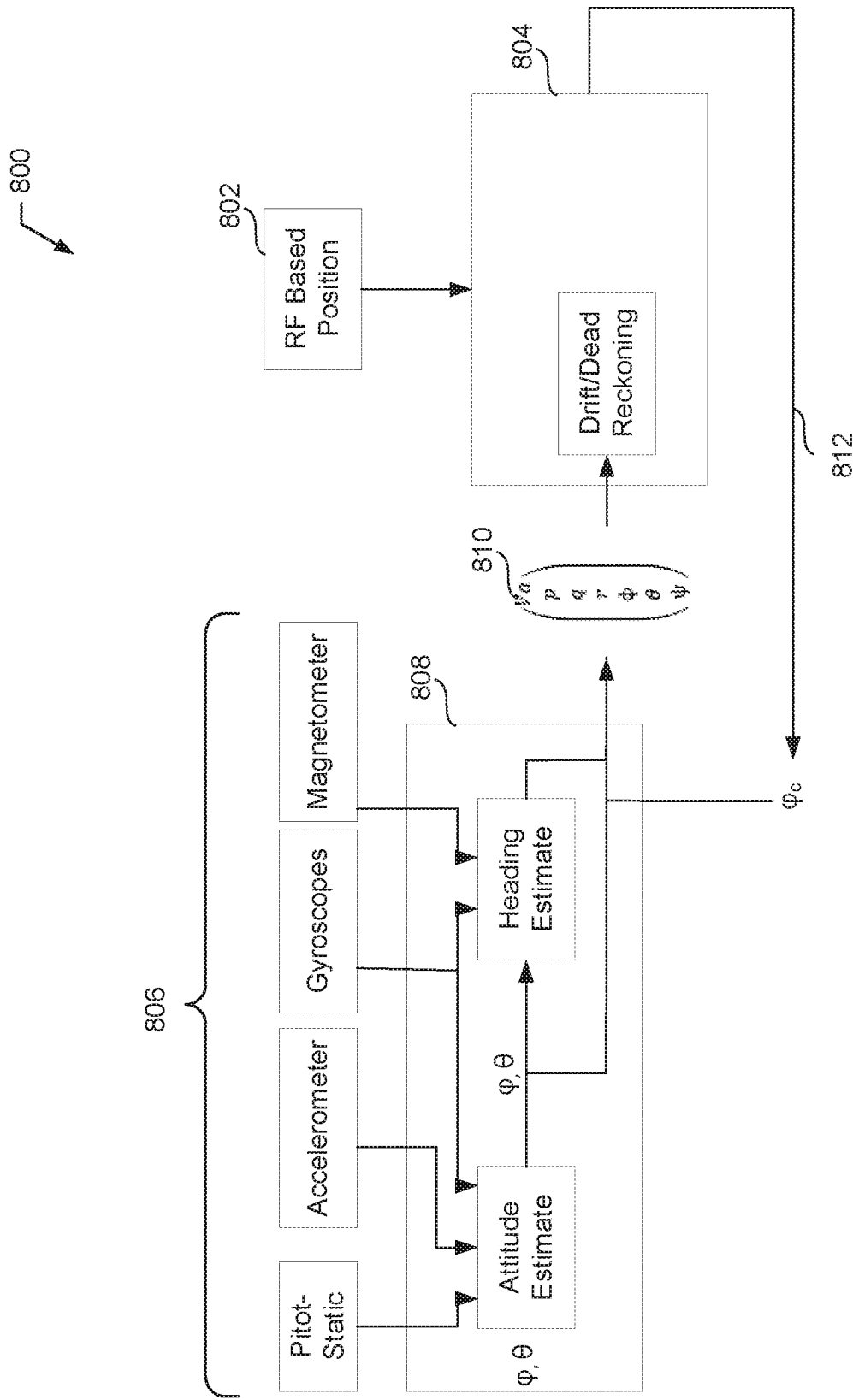
FIG. 8 illustrates an example avionics control scheme that can be implemented in examples disclosed herein.

FIG. 8 illustrates an example avionics control scheme 800 that can be implemented in examples disclosed herein. The example avionics control scheme 800 can be implemented by the navigation controller 110 of the aircraft 102 to direct navigation of the aircraft 102. In this example, a position or positional zone 802 calculated by the position calculator 504 is provided to be provided to a guidance logic 804. In some examples, the positional zone 802 also includes an uncertainty and/or consistency estimate to the guidance logic 804. Further, sensors 806 provide flight sensor data of the aircraft 102 to an attitude and heading reference system (AHRS) 808. In turn, the AHRS 808 provides an attitude estimate and a heading estimate to an aircraft kinematic model 810. Accordingly, the aircraft kinematic model 810 provides flight data information to the guidance logic 804. In this example, the guidance logic 804 provides a commanded rate of return 812 to the AHRS 808.

Figure 9B:
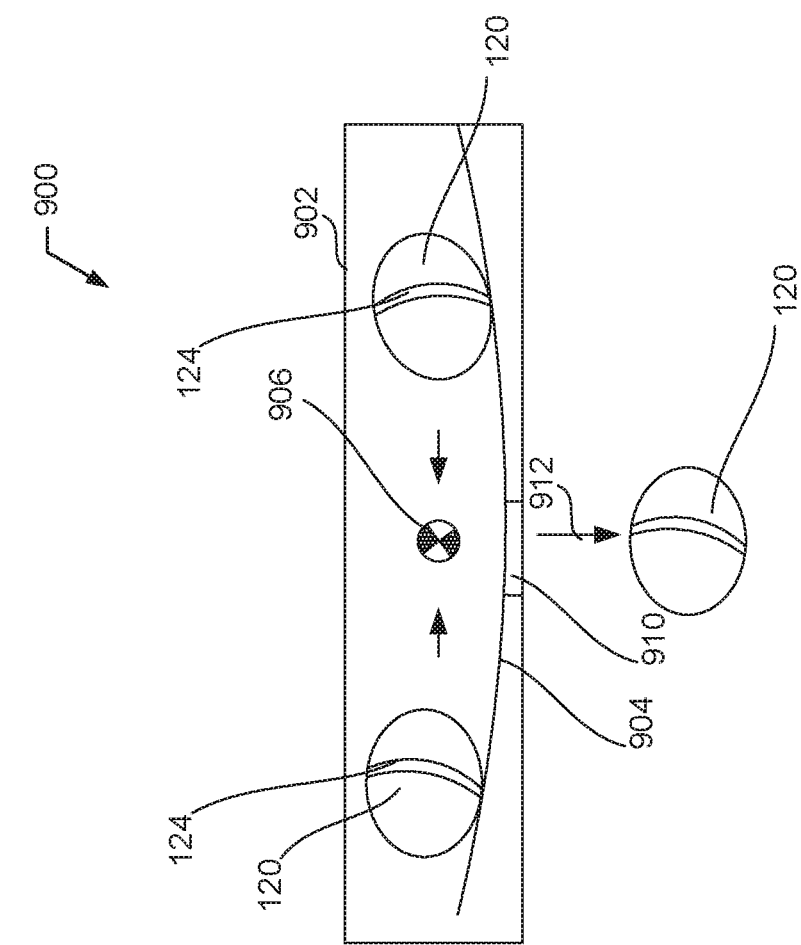
Figure 9A:
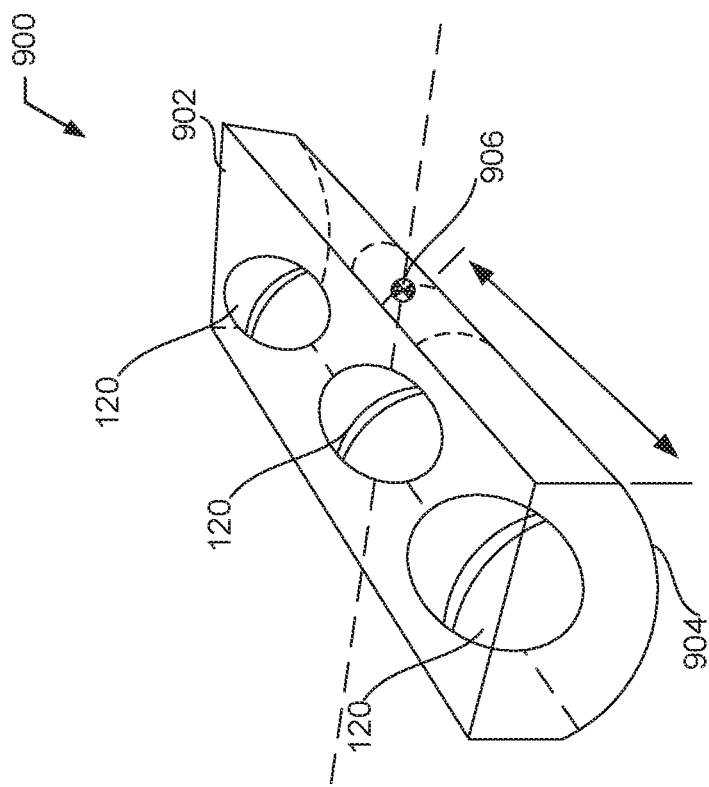

FIGS. 9A-9C depict an example beacon deployment system 900 that can be implemented in examples disclosed herein. For example, the beacon deployment system 900 can be implemented in the aircraft 102. Turning to FIG. 9A, the beacon deployment system 900 includes a container 902 that is depicted holding three of the beacons 120. The container 902 includes a curved bottom surface (e.g., an inclined bottom surface, a ramped bottom surface, etc.) 904 and corresponding center of gravity 906.

FIG. 9B depicts a frontal view of the beacon deployment system 900. In the illustrated example, the container 902 is shown as one of the beacons 120 is deployed. As can be seen in the example of FIG. 9B, the curved surface 904 enables the beacons 120 to move toward the center of gravity 906 and exit the container 902 via an opening 910, as generally indicated by an arrow 912. In other words, a contoured shape of the curved surface 904 enables gravity and/or a provided force (e.g., a spring force, a pressurized fluid, etc.) to urge the beacons 120 toward and out of the opening 910. Further, in this example, the transmitters 124 are wound around (e.g., wrapped around) the respective beacons 120 to facilitate movement thereof within the container 902.

Turning to FIG. 9C, the example beacon deployment system 900 is shown including doors (e.g., bay doors, release doors, etc.) 914. In this example, the doors 914 are movable (e.g., rotatable) relative to the container 902. In particular, opening the doors 914 away from the container 902 enables the beacons 120 to be released from the container 902. In particular, the example doors 914 are movable to cover and uncover the opening 910 shown in FIG. 9B.

Example 1 includes an apparatus having a transceiver of an aircraft to receive signals from deployed beacons, a signal analyzer to analyze the signals to determine distances of the respective beacons relative to the aircraft, and a position calculator to calculate a positional zone of the aircraft based on the distances.

Example 2 includes the apparatus as defined in example 1, further including a guidance controller to direct a movement of the aircraft based on the calculated positional zone.

Example 3 includes the apparatus as defined in any of examples 1 or 2, where the position calculator calculates the positional zone based on known positions of the beacons.

Example 4 includes the apparatus as defined in any of examples 1 to 3, where the beacons include global positioning system (GPS) receivers.

Example 5 includes the apparatus as defined in any of examples 1 to 4, where the aircraft includes a container to store the beacons, and wherein the beacons are deployed from the aircraft.

Example 6 includes the apparatus as defined in any of examples 1 to 5, where the signal analyzer determines the distances based on relative signal strengths of the beacons.

Example 7 includes a system for determining a positional zone of an aircraft. The system includes first and second beacons, the first and second beacons deployed to transmit signals, a transceiver of the aircraft to receive the signals, and a position calculator to determine a positional zone of the aircraft based on distances between the aircraft and the first and second beacons, the distances determined from the signals.

Example 8 includes the system as defined in example 7, further including a third beacon, wherein the position calculator determines a position of the aircraft based on signal strengths of the first, second and third beacons.

Example 9 includes the system as defined in any of examples 7 or 8, where the first and second beacons include floating buoys.

Example 10 includes the system as defined in any of examples 7 to 9, where the positional zone calculator determines the positional zone based on a lateration.

Example 11 includes the system as defined in any of examples 7 to 10, where the first and second beacons are deployed from the aircraft.

Example 12 includes the system as defined in example 11, where the first and second beacons include parachutes.

Example 13 includes the system as defined in any of examples 7 to 12, where the first and second beacons include GPS receivers.

Example 14 includes a method of determining a positional zone of an aircraft. The method includes deploying first and second beacons, transmitting signals from the first and second beacons, determining, by executing instructions with at least one processor, distances between the aircraft and the first and second beacons based on the signals, and calculating, by executing instructions with the at least one processor, the positional zone based on the distances.

Example 15 includes the method as defined in example 14, further including guiding, by executing instructions with the at least one processor, movement of the aircraft based on the positional zone and a flight path of the aircraft.

Example 16 includes the method as defined in any of examples 14 or 15, further including determining, by executing instructions with the at least one processor, positions of the first and second beacons.

Example 17 includes the method as defined in any of examples 14 to 16, where deploying the first and second beacons includes deploying the first and second beacons from the aircraft.

Example 18 includes the method as defined in any of examples 14 to 17, where the positional zone includes a position of the aircraft.

Example 19 includes the method as defined in any of examples 14 to 18, where calculating the positional zone includes performing a lateration calculation based on signal strengths of the signals.

Example 20 includes a non-transitory machine readable medium including instructions, which when executed, cause a processor to at least determine distances between an aircraft and first and second deployed beacons, the distances determined based on signals transmitted from the beacons and received at a transceiver of the aircraft, and calculate a positional zone of the aircraft based on the determined distances.

Example 21 includes the non-transitory machine readable medium as defined in example 20, where the instructions cause the processor to determine positions of the first and second beacons.

Example 22 includes the non-transitory machine readable medium as defined in any of examples 20 or 21, where the instructions cause the processor to guide movement of the aircraft based on the positional zone and a flight path of the aircraft.

From the foregoing, it will be appreciated that example methods, apparatus and articles of manufacture have been disclosed that enable aircraft that can be accurately navigated in areas with relatively low GPS signals. Examples disclosed herein can also enable aircraft without GPS hardware, thereby saving weight and cost.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a transceiver of an aircraft to receive first, second and third signals from deployed first, second and third beacons including respective global positioning system (GPS) receivers;
a signal analyzer to analyze the first, second and third signals to determine distances of the respective first, second and third beacons relative to the aircraft; and
a position calculator configured to:
determine a positional drift of ones of the first, second and third beacons based on GPS data therefrom,
calculate a positional zone of the aircraft based on the distances, positions of the first, second and third beacons, and the determined positional drift in response to the aircraft proceeding to or being positioned in an area with relatively low GPS signals,
determine a change of a flight path of the aircraft, and
direct at least one of the first, second or third beacons to move based on the change of the flight path of the aircraft.

2. The apparatus as defined in claim 1, further including a guidance controller to direct a movement of the aircraft based on the calculated positional zone.

3. The apparatus as defined in claim 1, wherein the aircraft includes a container to store the first, second and third beacons, and wherein the first, second and third beacons are deployed from the aircraft.

4. The apparatus as defined in claim 1, wherein the signal analyzer determines the distances based on relative signal strengths of the first, second and third beacons.

5. The apparatus as defined in claim 1, wherein the position calculator is to direct at least one of the first, second or third beacons to move based on the flight path of the aircraft.

6. The apparatus as defined in claim 1, wherein the position calculator is to determine the positional drift based on a movement from a release point.

7. The apparatus as defined in claim 1, wherein the aircraft is to deploy the first, second and third beacons to an area with sufficient GPS signals.

8. A system for determining a positional zone of an aircraft, the system comprising:
first, second and third beacons, the first, second and third beacons deployed to transmit first, second and third signals, respectively, the first, second and third beacons including respective global positioning system (GPS) receivers;
a transceiver of the aircraft to receive the first, second and third signals; and
a position calculator configured to:
determine a positional drift of ones of the first, second and third beacons based on GPS data therefrom,
determine, in response to the aircraft proceeding to or being positioned in an area with relatively low GPS signals, a positional zone of the aircraft based on distances between the aircraft and the first, second and third beacons, positions of the first, second and third beacons, the determined positional drift, and the distances determined from the first, second and third signals,
determine a change of a flight path of the aircraft, and
direct at least one of the first, second or third beacons to move based on the change of the flight path of the aircraft.

9. The system as defined in claim 8, wherein the first, second and third beacons include floating buoys.

10. The system as defined in claim 8, wherein the position calculator determines the positional zone based on a lateration.

11. The system as defined in claim 8, wherein the first, second and third beacons are deployed from the aircraft.

12. The system as defined in claim 11, wherein the first, second and third beacons include parachutes.

13. A method of determining a positional zone of an aircraft, the method comprising:
deploying first, second and third beacons;
transmitting first, second and third signals from the first, second and third beacons, respectively;
determining, by executing instructions with at least one processor, distances between the aircraft and the first, second and third beacons based on the first, second and third signals;
determining, by executing instructions with the at least one processor, a positional drift of ones of the first, second and third beacons based on global positioning system (GPS) data therefrom;
calculating, by executing instructions with the at least one processor, the positional zone based on the distances, the determined positional drift and positions of the first, second and third beacons in response to the aircraft proceeding to or being positioned in an area with relatively low GPS signals;
determining, by executing instructions with the at least one processor, a change of a flight path of the aircraft; and
directing, by executing instructions with the at least one processor, at least one of the first, second or third beacons to move based on the change of the flight path of the aircraft.

14. The method as defined in claim 13, further including guiding, by executing instructions with the at least one processor, movement of the aircraft based on the positional zone and the flight path of the aircraft.

15. The method as defined in claim 13, further including determining, by executing instructions with the at least one processor, positions of the first, second and third beacons.

16. The method as defined in claim 13, wherein deploying the first, second and third beacons includes deploying the first, second and third beacons from the aircraft.

17. The method as defined in claim 13, wherein the positional zone includes a position of the aircraft.

18. The method as defined in claim 13, wherein calculating the positional zone includes performing a lateration calculation based on signal strengths of the first, second and third signals.

19. A non-transitory machine readable medium comprising instructions, which when executed, cause a processor to at least:
cause a transceiver to receive first, second and third signals transmitted from first, second and third deployed beacons, respectively;
determine distances between an aircraft and the first, second and third deployed beacons, the distances determined based on the first, second and third signals transmitted from the first, second and third beacons, respectively;
determine a positional drift of ones of the first, second and third beacons based on global position system (GPS) data therefrom;
calculate a positional zone of the aircraft based on the determined distances, the determined positional drift, and the positions of the first, second and third beacons in response to the aircraft proceeding to or being positioned in an area with relatively low GPS signals;

determine a change of a flight path of the aircraft, and direct at least one of the first, second or third beacons to move based on the change of the flight path of the aircraft.

20. The non-transitory machine readable medium as defined in claim 19, wherein the instructions cause the processor to determine positions of the first, second and third beacons.

21. The non-transitory machine readable medium as defined in claim 19, wherein the instructions cause the processor to guide movement of the aircraft based on the positional zone and the flight path of the aircraft.

* * * * *